Feb. 21, 1939.  C. L. WAIT  2,148,410
PIPE LINE AUTOMATIC VALVE CONTROL
Filed Nov. 15, 1937   2 Sheets-Sheet 1

Charles L. Wait
INVENTOR

BY Philip A. H. Sewell
ATTORNEY

Feb. 21, 1939.   C. L. WAIT   2,148,410
PIPE LINE AUTOMATIC VALVE CONTROL
Filed Nov. 15, 1937   2 Sheets—Sheet 2
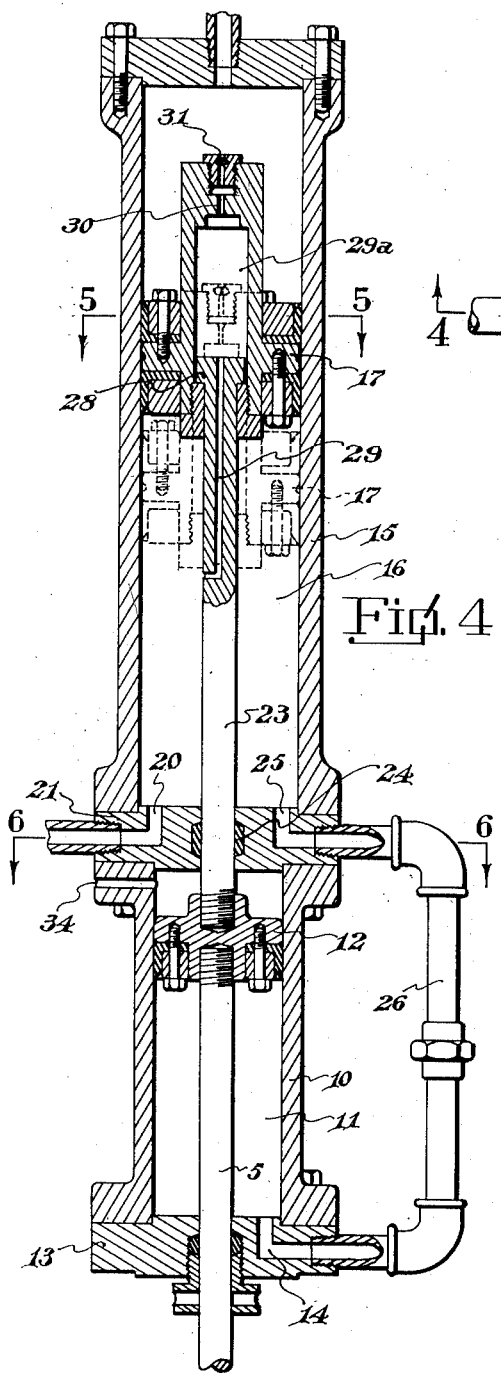
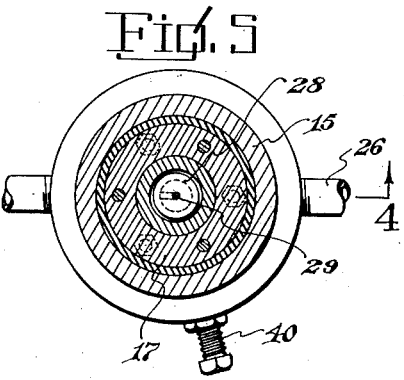
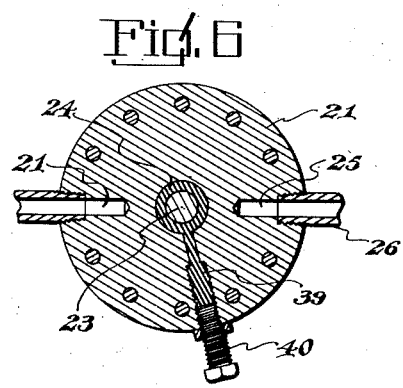
Charles L. Wait
INVENTOR
ATTORNEY Patented Feb. 21, 1939

2,148,410

UNITED STATES PATENT OFFICE 2,148,410

PIPE LINE AUTOMATIC VALVE CONTROL

Charles L. Wait, Tulsa, Okla., assignor to Automatic Valve Controller Company, Tulsa, Okla., a corporation of Oklahoma Application November 15, 1937, Serial No. 174,683

11 Claims. (Cl. 137—153)

The invention relates to automatically controlled valves adapted to be placed in pipe lines, for instance gas pipes, through which gas passes, under pressure, and to construct controls whereby the valves are normally maintained open by pressure from the gas line, and upon sudden loss of pressure in the gas line on opposite sides of a break in the line, which will lower the pressure adjacent the break, the valves on opposite sides of the break will automatically close, thereby preventing loss of gas and danger incident to exhaust of gas to the atmosphere at the point of break.

The principal object of this invention is to provide an automatic pipe line valve control that will permit the valve to remain open during normal demand from the line, and during normal pressure fluctuations over periods of time, caused by demand, but one that will close the valves when a sudden drop of pressure occurs, caused by a break in the line.

A further object is to provide an automatic cut-off comprising a cylinder in which is slidably mounted a piston rod carried by the valve blade, spaced pistons beneath one of which pressure is introduced from the pipe line and a bypass leading to the under side of a smaller piston for normally maintaining the pistons in raised position and the valve unseated in the pipe line.

A further object is to provide the valve rod with a port therethrough, discharging through an aperture in the upper piston and into the upper end of the top cylinder where it will enter the compression reservoir.

A further object is to slidably mount the upper piston on the valve rod so that it will have limited movement upwardly and downwardly, thereby preventing sticking of the piston in the cylinder and imparting a downward jarring action, giving the initial start to the closing operation when pressure is lost or reduced beneath the pistons to a point where the expansion or compression reservoir pressure forces the upper piston downwardly, against the lowered pressure in the line.

A further object is to provide the upper piston with an orifice plug which allows pressure from below the upper piston to seep into the upper end of the cylinder chamber above the upper piston for building up pressure in the compression reservoir for a valve closing operation upon rapid loss of pressure in the pipe line.

A further object is to provide an orifice, carried by the upper piston, forming a means to permit slow seepage from the upper end of the cylinder chamber into the lower end, equalizing the pressure in both, in order that a slow drop in pressure caused by normal demand, will not close the valve.

A further object is to make the orifice so small that the pressure seepage will be greatly delayed, thereby having the effect of trapped pressure in the pressure reservoir, for closing the valve when rapid pressure decrease occurs in the line, and also permitting slow pressure equalization from the reservoir to the line to prevent the valve closing during slow decrease in pressure in the line, due to normal demand.

A further object is to provide a valve control which will close a pipe line valve when a rapid pressure drop occurs in the pipe line, due to a break.

A further object is to provide a valve control which will hold the valve open during normal fluctuations of pressure in the pipe line.

A further object is to provide an exhaust means to the atmosphere above the lower piston thereby preventing air binding of the lower piston on its upward movement.

A further object is to provide manually operated exhaust means whereby the pressure from the pipe line may be cut off and the pressure from the under sides of the pistons exhausted to the atmosphere thereby allowing the valve to close under the influence of the pressure from the compression reservoir.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 4 is a vertical longitudinal sectional view on an enlarged scale through the cylinder, showing the pistons therein, taken on line 4—4 of Figure 5.

Figure 5 is a horizontal sectional view taken on line 5—5 of Figure 4.

Figure 6 is a horizontal sectional view taken on line 6—6 of Figure 4.

Figure 1:
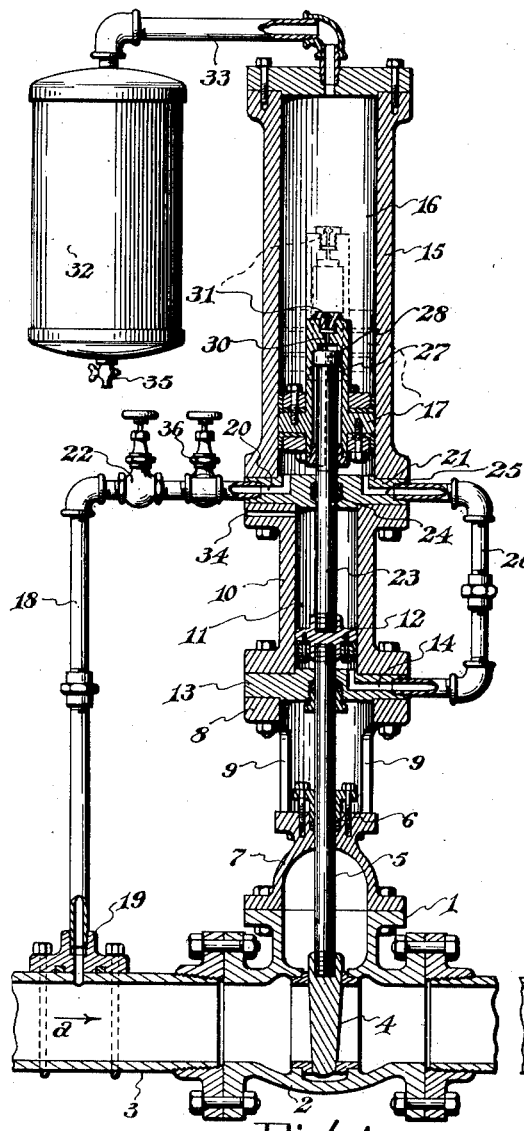
Figure 1 is a vertical longitudinal sectional view through the control and valve, showing the same in a conventional form of pipe line and with the valve closed.
Figure 2:
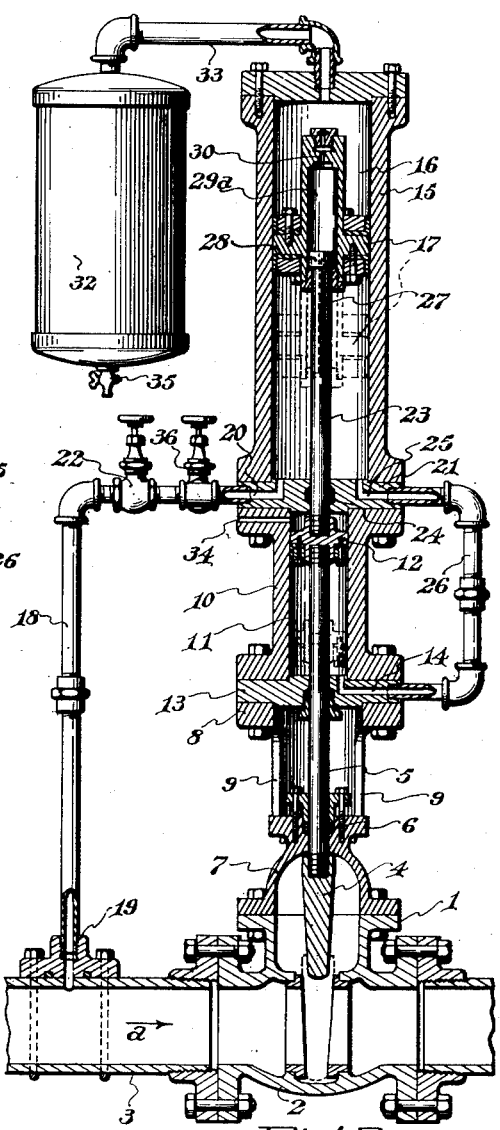
Figure 2 is a view similar to Figure 1, showing the valve open, and held open by pressure in the pipe line.
Figure 3:
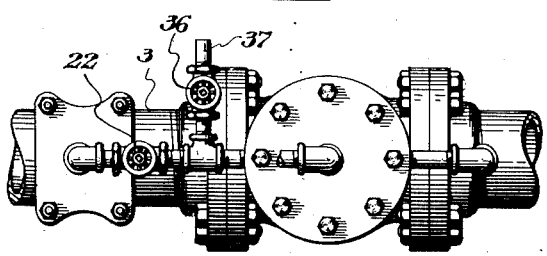
Figure 3 is a top plan view of the control and valve.

The automatic valve control hereinafter set forth is adapted to be used in pipe lines, for instance gas pipe lines, and preferably in series at intervals with other similar valves, whereby upon breakage in the pipe line and loss of pressure at any point, the adjacent valves will automatically close. The closing prevents loss of gas or other fluid incident to the break.

In the drawings a single valve is described and shown.

The automatic valve is adapted to be attached to the upper flange 1 of the gate valve body 2, which is in the pipe line 3. The gate valve is provided with a conventional form of gate 4, having an upwardly extending reciprocating valve stem 5 extending through the packing gland 6 carried by the valve bonnet 7.

The bonnet 7 is provided with a supporting bracket 8, having openings 9 in opposite sides thereof, whereby the packing gland 5 may be reached for repair and tightening purposes. It will be noted that the gate valve structure and body is not modified, hence the device may be applied to gate valves now in use, thereby reducing the cost of applying the automatic valve to a minimum.

Gas flows in the direction of the arrow a through the pipe 3 as shown in Figure 1, and the operation will be referred to in relation to the upstream and downstream side of the valve. Pipe 3 leads to a pumping station where there are pressure gauges indicating the pressure maintained in the pipe line, and when there is a break in the pipe line these gauges fluctuate, therefore the pumps can be stopped for reducing the pressure on the upstream side of the break, however, the automatically controlled valve adjacent the break will close as the pressure loss takes place rapidly at this point. The same is true of the valve adjacent the break on the downstream side. In operation, however, the valve control is designed so it will not operate the valve during ordinary demand pressure on the line as a whole, therefore the valve will not close automatically except in case of rapid loss of pressure, for instance when there is a break in the line.

Interposed between the auxiliary cylinder 10 and the bracket 8 is a flange 13 having an intake port 14 extending laterally therethrough and communicating with the lower end of the auxiliary chamber 11 below the small auxiliary piston 12.

Supported on the bracket 8 is an auxiliary cylinder 10, in the chamber 11 of which is slidably mounted a small auxiliary piston 12, to which is connected the valve stem 5.

Axially disposed above the auxiliary cylinder 10 is a main cylinder 15 having a chamber 16 therein, larger than the auxiliary chamber 11, and slidably mounted in the main chamber 16 is a main piston 17, which is larger than the auxiliary piston 12, and which main piston is normally forced upwardly by gas pressure from the pipe line 3 on the upstream side of the valve and through the by-pass pipe 18, connected at 19 to the pipe line 3, and discharging through the port 20 of the insert flange 21 between the main and auxiliary cylinders. A valve 22 is preferably provided in the by-pass pipe 18 so that pressure may be turned off from the control structure for manual control for repair or other purposes. It will be noted that gas entering the lower end of the main chamber 16 beneath the main piston 17 will force said piston upwardly on the valve rod 23, which is connected to the auxiliary piston 12, and is slidably mounted in the packing gland 24 of the flange 21, and the gas will pass through the port 25 and through bypass pipe 26, the port 14 and to the underside of the auxiliary piston 12, thereby forcing both pistons upwardly and opening the gate valve 4. It will be noted that the main piston 17 is slidably mounted on the headed end 27 of the extension valve stem 23, and as it is forced upwardly by the pressure, there will be a jarring action on the head 28 of valve stem 23, thereby breaking any binding or sticking of the valve blade 4 or piston 12.

Extension valve stem 23 is provided with an axially extending bypass port 29, which extends through the head 28 and discharges into the chamber 29a of the piston above the head and bypasses some of the gas and pressure through port 30 in the upper end of the main piston 17 and past the orifice 31, thereby slowly building up pressure above the piston and in the expansion tank 32 having a pipe connection 33 with the upper end of the cylinder 15.

By having the orifice 31 relatively small in relation to the size of the port 20, it will be seen that the pressure will build up slowly above the main piston and will not interfere with the upward movement thereof. The pressure above the piston 17 will eventually build up but the piston will be prevented from downward movement until the pressure drops below. Gas pressure is bypassed through the pipe 26 to the under side of the auxiliary piston 12 and exerts an upward pressure on piston 12, thereby carrying the weight of the valve blade 4 and valve rod 23 and 5. Air is exhausted from the upper side of piston 12 in its upward movement by means of an exhaust port 34 which communicates with the atmosphere.

Where there is a break in the pipe line on the downstream side of the valve, for instance as shown in Figure 1, the instruments in the station will fluctuate and the operator will stop the pump, however there is a rapid loss of pressure adjacent the break in comparison with other parts of the line, consequently the valves on each side of the break will automatically close. As there is loss of pressure in the pipe line, there is an exhaust of pressure from the lower end of the auxiliary chamber 11 through pipe 26 and also from the lower end of the main chamber 16 and thence through pipe 18 into the main pipe line 3. This exhaust of gas allows the overbalancing pressure above the piston 17 to force said piston downwardly, imparting a hammering action on the head 28 of extension stem 23, and forcing said extension stem 23 and piston 12 downwardly and closing the valve blade 4. Upon resumption of pressure, for instance after the break in the line is repaired, the valve is again opened by the upward movement of pistons 17 and 12, against the remaining pressure in the expansion tank 32, however this tank may be drained or discharged after the repair of the break line if desired by opening the pet cocks 35 and to drain condensate.

All the valves of the pipe line will not close upon the break in any particular section, but only those adjacent the break. This is caused by the fact that the pressure is lost rapidly adjacent the break, and remote valves will not be effected. Sometimes it is desirable to manually close the valve, and to accomplish this result, valve 22, in bypass 18 is closed and exhaust valve 36 in exhaust pipe 37 is opened. Exhaust pipe 37 exhausts to the atmosphere, therefore it will be seen that the gas pressure beneath the pistons 12 and 17 will be relieved, thereby allowing the pressure above the main piston 17 to move downwardly to close the gate valve 4. The control will not operate the valve during ordinary demand fluctuations, which will vary from time to time. These demand fluctuations will at times reciprocate the main piston 17 therefore these movements of the piston will prevent sticking of the piston in the main cylinder 15. The packing gland 24 in the flange 21 may be supplied with additional packing material having an injector screw 40, which when tightened will squeeze the packing material into the gland through port 39.

The pressure fluctuations, caused by normal demand, rise and fall slowly, and during this time the orifice 31 permits equalization of pressure above and below the top piston and by this action the differential of pressure above the piston is not sufficient to overcome the total upward pressure under both pistons, therefore the valve will remain open during normal pressure fluctuations in the pipe line.

From the above it will be seen that an overbalancing pressure control valve is provided for pipe lines, particularly gas pipe lines, which may be applied to valves, for instance gate valves now in use, and the device is simple in construction, the parts reduced to a minimum, and one which may be cheaply manufactured and sold.

The invention having been set forth what is claimed as new and useful is:

1. The combination with a pipe line having fluid pressure therein, a valve carried by said pipe line for cutting off the flow of fluid therethrough, of means for opening and closing said valve under the influence of the pressure within the pipe line, said valve having a valve stem extending into a main and an auxiliary chamber, pistons carried by the valve stem and disposed within said cylinders, one of said pistons being smaller than the other, bypass means between the pipe line and the cylinders beneath the larger piston and from which cylinder fluid pressure is bypassed to a position beneath the smaller piston, means for bypassing fluid pressure through the larger piston to a point above the same and against which the main pressure acts against the large piston and means for controlling the flow of fluid pressure to the cylinders.

2. The combination with a fluid pipe line having a gate valve therein for controlling the flow through the pipe line, of means for maintaining said valve open and for closing said valve when the pressure in the pipe line rapidly falls, said means comprising a valve stem carried by the valve, pistons of different size carried by the valve stem, cylinders having chambers of different size and in which the pistons are slidably mounted, bypass means between the pipe line and the cylinder chamber beneath the large piston, bypass means between the chamber of the large cylinder beneath the large piston and the chamber of the lower cylinder beneath the small piston and means whereby a delayed flow of pressure may pass through the large piston into the upper end of the chamber of the large cylinder, the combined pressure on the under sides of both pistons overcoming the pressure in the upper end of the large chamber upon normal pressure in the pipe line.

3. The combination with a device as set forth in claim 2 including a limited slidable connection between the large piston and the valve stem thereby allowing the movement of the large piston to have a jarring action on the valve stem.

4. A device as set forth in claim 2 including an expansion tank in connection with the upper end of the large cylinder.

5. A device as set forth in claim 2 including an expansion tank connection with the large cylinder above the piston therein, means for controlling the flow of fluid through the bypass means between the cylinder and the pipe line.

6. A device as set forth forth in claim 2 including means for cutting off the flow of fluid pressure through the bypass means between the pipe line and the large cylinder and means for exhausting pressure to the atmosphere from the chamber of the large cylinder for manual control.

7. The combination with a gate valve carried by a fluid pressure line, of means whereby the pressure within the pipe line will maintain the gate valve open and will close said gate valve when the pressure falls rapidly, said means comprising superimposed cylinders axially alined and having chambers of different diameters, a valve stem carried by the gate valve and extending into said chamber, pistons carried by said valve stem within the chambers and of different diameters, means for discharging fluid pressure beneath one of said pistons and also bypassing said fluid pressure to a position beneath the other piston for forcing said pistons upwardly and the valve to open position, and means for bypassing a reduced flow of fluid pressure into the upper end of one of the cylinders and against which pressure the pistons move under the pipe line pressure, the effective pressure areas of both pistons being normally greater than the pressure accumulated in the upper end of the upper cylinder thereby overcoming the pressure in said upper cylinder until rapid loss of pressure beneath the pistons.

8. The combination with a gate valve carried by a pipe line having fluid pressure therein, of means for maintaining said gate valve open under the influence of the pressure and closing the gate valve upon rapid loss of pressure, said means comprising spaced cylinders having chambers of different size, a valve stem extending into said chambers, pistons of different sizes carried by the valve stem and disposed in the chambers of the cylinders, means for bypassing fluid pressure from the pipe line into the chambers beneath the pistons for raising the pistons and opening the valve and means for bypassing a retarded flow of fluid pressure through one of the pistons into the upper end of its chamber and against which pressure the pistons move.

9. A device as set forth in claim 8 wherein one of the pistons has a limited sliding action in both ways on the valve stem, whereby at periods of operation the upper piston will have a breathing, pulsating action within the cylinder to keep the piston from sticking.

10. A device as set forth in claim 8 including a reduced pressure bypass through a portion of the valve stem and a slidable piston, and an orifice carried by said slidable piston.

11. A device as set forth in claim 8 including an expansion reservoir in connection with the chamber of one of the cylinders above the pistons.

CHARLES L. WAIT.